United States Patent
Naoe et al.

(10) Patent No.: US 6,680,088 B2
(45) Date of Patent: Jan. 20, 2004

(54) PROCESS FOR PRODUCING MAGNETIC RECORDING MEDIUM

(75) Inventors: Koji Naoe, Kanagawa (JP); Hiroyuki Kobayashi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/151,998

(22) Filed: May 22, 2002

(65) Prior Publication Data

US 2003/0021891 A1 Jan. 30, 2003

(30) Foreign Application Priority Data

May 23, 2001 (JP) .................................. 2001-153974

(51) Int. Cl.[7] .............................................. B05D 3/00
(52) U.S. Cl. ........................ 427/565; 427/128; 427/131; 427/407.1; 427/600
(58) Field of Search ............................ 427/128, 131, 427/407.1, 600, 565

(56) References Cited

U.S. PATENT DOCUMENTS

| 5,064,687 A | 11/1991 | Matsufuji et al. ............ 427/132 |
| 6,129,979 A | 10/2000 | Kawamata et al. ......... 428/216 |

FOREIGN PATENT DOCUMENTS

| JP | 7-014159 | 1/1995 |
| JP | 7-153074 | 6/1995 |
| JP | 10-251561 | 9/1998 |

*Primary Examiner*—Bernard Pianalto
(74) *Attorney, Agent, or Firm*—Sughrue Mion, PLLC

(57) ABSTRACT

A process for producing a magnetic recording medium is provided in which a magnetic layer including a ferromagnetic powder and a binder is provided on a non-magnetic flexible support. In the process, a magnetic liquid containing mainly a ferromagnetic powder and a binder, and an abrasive liquid paste including an abrasive and a binder are prepared separately, and the abrasive liquid paste is subsequently subjected to an ultrasonic dispersion treatment and then mixed with the magnetic liquid to prepare a magnetic coating solution for the magnetic layer.

18 Claims, 2 Drawing Sheets

PROCESS FOR PRODUCING MAGNETIC RECORDING MEDIUM

BACKGROUND OF THE INVENTION

1. Field of the Invention

The present invention relates to a process for producing a magnetic recording medium and, in particular, a high density magnetic recording medium that has a low level of head wear as well as excellent transport durability.

2. Description of the Related Art

In recent years, there has been a trend for the density of magnetic recording to increase and for the recording wavelength to decrease. There is a high demand for magnetic recording media with a magnetic layer having a smoother surface, thereby reducing spacing loss. As one method for smoothing the surface of the magnetic layer, there is a technique involving increasing the degree of dispersion of a magnetic liquid. In general media dispersion, the degree of dispersion can be increased by dispersing for a long time using, as media beads, high density media such as zirconia beads, employing a high packing ratio of the media beads, a high circumferential velocity, etc. In cases where the surface of the magnetic layer can be made smoother by the above-mentioned technique, fine abrasive particles are localized on the very surface of the magnetic layer, the degree of packing of magnetic material on the very surface decreases, thereby causing the problem of low output, and the protrusion height of the abrasive on the surface of the magnetic layer decreases, thereby causing the problem of poor transport durability. When an abrasive that is used for smoothing the surface of the magnetic layer is made into fine particles, the above-mentioned problems are further worsened.

As one means for solving these problems, JP-A-7-14159 (JP-A denotes a Japanese unexamined patent application publication) discloses a method in which an abrasive and carbon black used in a magnetic liquid are each made into a paste separately from a magnetic coating solution comprising a ferromagnetic powder and a binder, they are dispersed individually, and then mixed. In this method, the magnetic coating solution, an abrasive liquid paste, and a carbon black liquid paste are dispersed individually to their own optimally dispersed states, and then mixed to prepare a coating solution. The problem of the degree of packing of the magnetic layer and the problem of poor durability due to a lower protrusion height on the surface of the magnetic layer can thus be substantially solved. However, this method for preparing a magnetic coating solution by separate dispersion and mixing can cause new problems such as an increase in head wear due to aggregation of the abrasive and a decrease in the durability due to aggregation of the abrasive and the carbon black.

As hereinbefore described, it is difficult to produce a magnetic recording medium having a magnetic layer with a smoother surface and giving a high output, excellent transport durability, and low head wear, and there is a desire for two or three of these characteristics to be achieved simultaneously.

As a result of an intensive investigation by the present inventors in order to simultaneously satisfy two or three of the above-mentioned characteristics, a specific process for producing a magnetic recording medium has been found.

BRIEF SUMMARY OF THE INVENTION

It is an object of the present invention to provide a process for producing a magnetic recording medium having a smooth magnetic layer surface, good electromagnetic conversion characteristics, excellent transport durability, and low head wear.

As a result of an intensive investigation by the present inventors into a process for producing a magnetic recording medium in order to achieve the object, a magnetic recording medium having good electromagnetic conversion characteristics, excellent transport durability, and low head wear has been produced.

The object can be attained by a process for producing a magnetic recording medium in which a magnetic layer comprising a ferromagnetic powder and a binder is provided on a non-magnetic flexible support, the process comprising a step (1) for separately preparing a magnetic liquid comprising mainly a ferromagnetic powder and a binder, and an abrasive liquid paste comprising an abrasive and a binder, and then a step (2) for subjecting the abrasive liquid paste to an ultrasonic dispersion treatment and then mixing it with the magnetic liquid to prepare a magnetic coating solution for the magnetic layer.

The object can also be attained by a process for the production of a magnetic recording medium in which a magnetic coating solution comprising a ferromagnetic powder and a binder is coated on a non-magnetic flexible support, the process comprising a step (1) for separately preparing a magnetic liquid comprising mainly a magnetic powder and a binder, an abrasive liquid paste comprising an abrasive and a binder, and a carbon black liquid paste comprising carbon black and a binder, and then a step (2) for subjecting the abrasive liquid paste and the carbon black liquid paste individually to an ultrasonic dispersion treatment and then mixing them with the magnetic liquid to prepare a magnetic coating solution.

BRIEF DESCRIPTION OF THE DRAWING

FIG. 1 is a flow diagram showing one embodiment of the production process of the present invention. An abrasive liquid paste is dispersed by a two stage cascade type ultrasonic disperser and then mixed with a magnetic liquid, and the liquid mixture so obtained is finally sent to a coating machine via other steps.

FIG. 2 is a flow diagram showing another embodiment of the production process of the present invention. An abrasive liquid paste and a carbon black liquid paste are dispersed by a tandem type ultrasonic disperser and then mixed with a magnetic liquid, and the liquid mixture so obtained is finally sent to a coating machine via other steps.

DETAILED DESCRIPTION OF THE INVENTION

The ultrasonic dispersion treatment carried out in the production process of the present invention is now explained.

The ultrasound that is employed in the present invention consists of sound waves having a frequency of about 20 kHz or above and is inaudible to the human ear. Ultrasonic dispersion and ultrasonic dispersers are known, and it is thought that microcavities are formed in a liquid by irradiation with ultrasound, and the microcavities mechanically disperse aggregates in the liquid into primary particles. In order to increase the efficiency of the ultrasonic dispersion, it is preferable to optimize the frequency and amplitude of the ultrasound emitted by the ultrasonic disperser, the area of the irradiated section, the surface tension, temperature and viscosity of a liquid undergoing dispersion, etc. In a so-called flow irradiation system in which ultrasonic dispersion is carried out with a continuous flow of a liquid undergoing dispersion, the flow rate, pressure, etc. are also factors controlling dispersion. In general, it is preferable for the frequency of the ultrasound used for dispersion to be comparatively low, and it is preferably about 15 to 40 kHz, and particularly preferably 15 to 20 kHz. The temperature is preferably 40° C. to 50° C. for an aqueous dispersion. In terms of the generation of cavities, the viscosity is preferably comparatively low, and too high a viscosity will suppress the generation of cavities.

In the production process of the present invention any commercial ultrasonic disperser from various manufacturers can be used. For example, an ultrasonic homogenizer manufactured by Nippon Seiki Seisakujo K. K. can be cited. A US-600T flow system disperser from this company can be used as one embodiment with conditions of a frequency of 20 kHz, an amplitude of 30 $\mu$m, an irradiation area of 36 mm$\phi$, a holder internal volume of 34 ml, a distance between the irradiation area and the holder of 2 to 5 mm, and a flow rate of 25 to 550 g/min, and it is preferably used while a cooling liquid passes through a vessel.

Irradiation with ultrasound may be carried out in any number of stages. As one embodiment, a two-stage cascade ultrasonic disperser can be provided in an in-line production system. In particular, when there is a large amount of liquid to be treated, a high dispersion efficiency can be maintained by employing multiple stages. A multiple stage type having about 10 stages can be employed, but there are preferably 2 to 5 stages.

In the production process of the present invention, an abrasive liquid paste comprising an abrasive and a binder and, if necessary, a carbon black liquid paste comprising carbon black and a binder, are subjected to an ultrasonic dispersion treatment after decreasing the concentrations of the liquids if necessary. Prior to the ultrasonic dispersion treatment, the abrasive liquid paste, and if necessary the carbon black liquid paste, may be subjected to a preliminary dispersion treatment using a sand grinder (sand mill). The dispersion treatment using the sand mill preferably employs glass beads, and particularly preferably zirconia (Zr) beads. Subsequent to the preliminary dispersion treatment, it is preferable to dilute the abrasive liquid paste with a coating solvent so as to decrease the concentration of the abrasive liquid paste and, if necessary, the carbon black liquid paste, and at the same time the particle size of the abrasive, and if necessary the carbon black, can be measured. The particle size can be measured by various types of method such as a method known as a tri-laser system measurement method. The abrasive liquid paste that has been subjected to the ultrasonic dispersion treatment is mixed with a magnetic liquid to give a coating solution for a magnetic layer. The (diluted) abrasive liquid paste thus ultrasonically dispersed may be mixed in an in-line step where it can be mixed continuously with a magnetic liquid.

The ultrasonic disperser may preferably be equipped with a feedback mechanism for making the amplitude uniform in the dispersion step.

Figure 1:
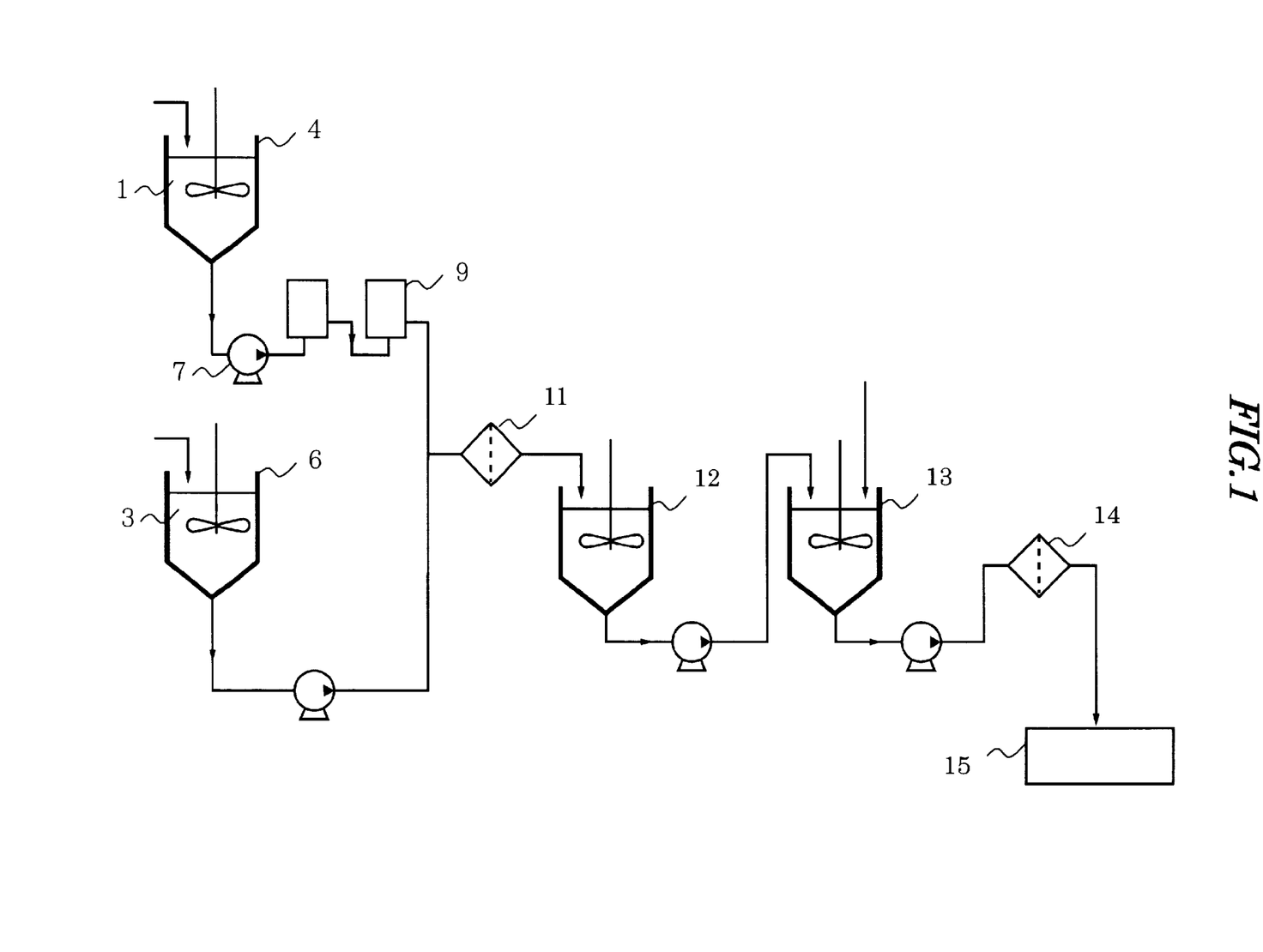
Figure 2:
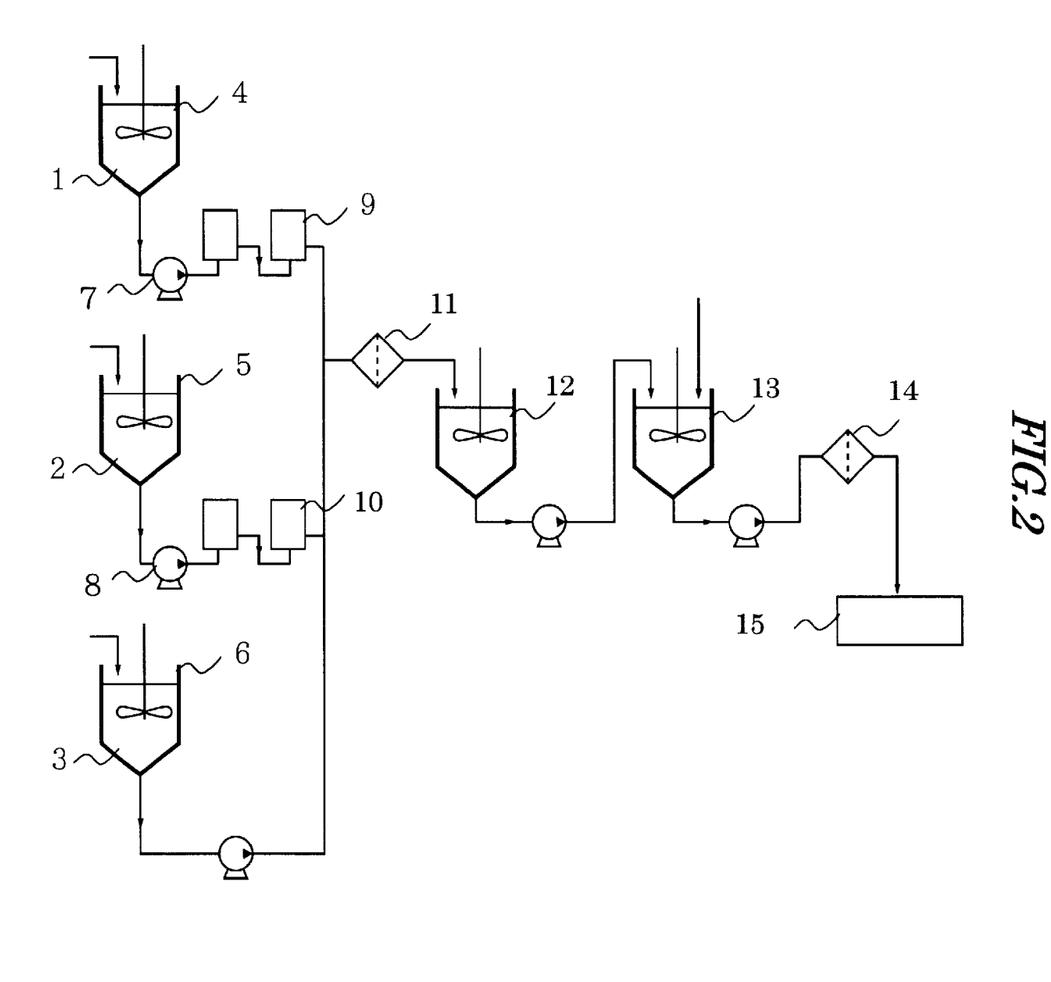

FIGS. 1 and 2 illustrate embodiments of the production process of the present invention. An abrasive liquid paste 1 comprising an abrasive and a binder and, if necessary, a carbon black liquid paste comprising carbon black and a binder, are fed from stirrers 4 and 5 to two-stage cascade type ultrasonic dispersers 9 and 10 via liquid feed pumps 7 and 8 and subjected to an ultrasonic dispersion treatment. The abrasive liquid paste and the carbon black liquid paste thus ultrasonically treated are then filtered through a filter 11 together with a magnetic liquid 3 that has been mixed by a stirrer 6, and mixed by a stirrer 12. This mixture is further mixed with a solution of stearic acid and butyl stearate in a stirrer 13 to give a magnetic coating solution. The magnetic coating solution so prepared is filtered through a filter 14, then sent to a coating machine 15 and coated on a support.

With regard to the abrasive used in the magnetic layer of the present invention, generally used materials can be employed, and examples thereof include $\alpha$-alumina, $\gamma$-alumina, fused alumina, corundum, artificial corundum, silicon carbide, chromium oxide ($Cr_2O_3$), diamond, synthetic diamond, garnet, emery (main components: corundum and magnetite), and $\alpha$-$Fe_2O_3$. These abrasives have a Mohs' hardness of at least 6. Specific examples thereof include AKP-10, AKP-12, AKP-15, AKP-20, AKP-30, AKP-50, AKP-1520, AKP-1500, HIT-50, HIT-60A, HIT-70, HIT-80, and HIT-100 (manufactured by Sumitomo Chemical Co., Ltd.), G-5, G-7, S-1, and Chromium Oxide K (manufactured by Nippon Chemical Industry Co., Ltd.), UB40B (manufactured by C. Uyemura & Co., Ltd.), WA8000 and WA10000 (manufactured by Fujimi Incorporated), and TF-100, TF-140, and TF-180 (manufactured by Toda Kogyo Corp.). A powder having an average particle size of 0.05 to 3 $\mu$m, and preferably 0.05 to 1 $\mu$m, can give a large effect.

The magnetic layer of the magnetic recording medium of the present invention can contain electrically conductive particles as an antistatic agent in addition to the above-mentioned abrasive. However, in the case of a magnetic recording medium having a non-magnetic layer between a support and a magnetic layer, in order to maximize the saturation magnetic flux density of the upper layer, the electrically conductive particles are preferably added to a coating layer other than the upper layer while minimizing the amount thereof added to the upper layer. Adding carbon black as the antistatic agent is particularly preferable in terms of reducing the electrical resistance of the surface of the entire medium. Examples of the carbon black include furnace black for rubber, thermal black for rubber, black for coloring, electrically conductive carbon black, and acetylene black. The carbon black preferably has an $S_{BET}$ of 5 to 500 m$^2$/g, a DBP oil absorption of 10 to 1500 ml/100 g, an average particle size of 5 to 300 nm, a pH of 2 to 10, a water content of 0.1 to 10%, and a tap density of 0.1 to 1.0 g/ml.

In general, carbon black is used not only as an antistatic agent but also in order to reduce the coefficient of friction, impart light-shielding properties, improve the film strength, etc. These additional functions can be controlled by choosing the type, the amount and the combination of carbon black according to the intended purpose on the basis of the above-mentioned various properties such as particle size, oil absorption, and pH value, and electrical conductivity. Regarding the carbon black that can be used here, for example, those described in the 'Carbon Black Handbook' (edited by the Carbon Black Association of Japan) can be referred to.

The total amount of carbon black added is 0.1 to 5 parts by weight relative to 100 parts by weight of magnetic material, and preferably 0.3 to 2 parts by weight. When it is less than 0.1 parts by weight, the durability tends to be insufficient, and when it exceeds 5 parts by weight, the surface properties and the degree of packing tend to deteriorate.

Carbon black can also be used in a non-magnetic layer, and in this case it is added at 3 to 20 parts by weight relative to a non-magnetic inorganic powder (the non-magnetic powder does not include the carbon black).

With regard to a binder that can be used in combination with the abrasive or the carbon black, a vinyl chloride copolymer, a polyurethane resin, etc. can be used, and the ratio by weight thereof relative to the abrasive or the carbon black is 1/20 to 1/2, and preferably 1/20 to 1/5.

The total amount of abrasive added is 1 to 20 parts by weight relative to 100 parts by weight of the magnetic material, and preferably 1 to 15 parts by weight. When it is less than 1 part by weight, the durability tends to be insufficient, and when it exceeds 20 parts by weight, the surface properties and the degree of packing tend to deteriorate.

The present invention can preferably be applied to a process for producing a magnetic recording medium comprising a non-magnetic support, a lower layer comprising mainly a non-magnetic inorganic powder and a binder provided thereon, and a magnetic layer comprising a ferromagnetic powder, an abrasive, and a binder provided on top of the lower layer.

The magnetic layer may be a single layer or comprise two or more layers. In the latter case, the magnetic layers can be positioned so as to adjoin each other or there can be a layer other than a magnetic layer therebetween according to the intended purpose, and a known layer structure can be employed. The thickness of the magnetic layer referred to in the present invention denotes the thickness of the uppermost (outermost) magnetic layer if a plurality of magnetic layers are employed.

In this case, the thickness of the magnetic layer is preferably 0.05 $\mu$m to 0.3 $\mu$m.

As an example of the magnetic layer having a plurality of layers, there is a combination of magnetic layers in which a ferromagnetic powder selected from ferromagnetic iron oxide, ferromagnetic cobalt-modified iron oxide, a $CrO_2$ powder, a hexagonal ferrite powder, various types of ferromagnetic metal powder, etc. is dispersed in a binder. In this case, it is possible to combine magnetic layers containing ferromagnetic powders of the same type but of different elemental compositions, powder sizes, etc.

In the present invention, it is preferable to use a magnetic recording medium having a non-magnetic layer between the support and a magnetic layer containing a ferromagnetic metal powder or a hexagonal ferrite powder.

With regard to the non-magnetic powder used in the non-magnetic layer, as inorganic compounds, various types of material can be cited. For example, $\alpha$-alumina with an $\alpha$-component proportion of at least 90%, $\beta$-alumina, $\gamma$-alumina, silicon carbide, chromium oxide, cerium oxide, hematite ($\alpha$-iron oxide), goethite (iron oxyhydroxide), corundum, silicon nitride, titanium carbide, titanium oxide, silicon dioxide, boron nitride, zinc oxide, calcium carbonate, calcium sulfate, barium sulfate, etc. can be used singly or in combination. With regard to the hematite and goethite, it is also preferable to use hematite, goethite, etc. which are used as intermediates for magnetic iron oxide and for a ferromagnetic metal powder produced by an iron oxide reduction method.

The non-magnetic powder may be subjected to a surface treatment in order to strengthen the interaction with the binder and improve the dispersibility. The surface treatment can be carried out using, for example, a compound containing an element such as Si or Al or both Al and Si so as to form at least a layer of silica, alumina or silica-alumina on the surface of the non-magnetic powder. Alternatively, the surface of the non-magnetic powder may be treated with a coupling agent such as a silane coupling agent or a titanate coupling agent. The non-magnetic powder preferably has a tap density of 0.3 to 2 g/ml, a water content of 0.1 to 5 wt %, a pH of 2 to 11, and a BET specific surface area ($S_{BET}$) of 5 to 100 m²/g.

With regard to the ferromagnetic powder of the present invention, a ferromagnetic metal powder and a hexagonal ferrite powder are preferred.

The saturation magnetization of the ferromagnetic metal powder is usually 120 to 170 A·m²/kg (120 to 170 emu/g), and preferably 135 to 170 A·m²/kg (135 to 170 emu/g). The saturation magnetization of the ferromagnetic metal powder can be enhanced effectively by slow oxidation after treatment with the coupling agent, which can have various substituents, or with a compound described in JP-A-61-52327 and JP-A-7-94310 immediately after reduction.

The coercive force of the ferromagnetic metal powder is usually $13.5 \times 10^4$ to $23.8 \times 10^4$ A/m (1700 to 3000 Oe), and preferably $14.3 \times 10^4$ to $22.3 \times 10^4$ A/m (1800 to 2800 Oe).

With regard to the ferromagnetic metal powder used in the magnetic layer of the present invention, a ferromagnetic alloy powder having $\alpha$-Fe as a main component is preferable. These ferromagnetic metal powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferable for the powder to contain, in addition to $\alpha$-Fe, at least one chosen from Al, Si, Ca, Y, Ba, La, Nd, Co, Ni and B, and more preferably at least one of Co, Y, and Al. The Co content is preferably 0 to 40 atomic % relative to Fe, more preferably 10 to 40 atomic %, and yet more preferably 20 to 35 atomic %. The Y content is preferably 1 to 15 atomic %, more preferably 3 to 10 atomic %, and yet more preferably 4 to 9 atomic %. The Al content is preferably 2 to 20 atomic %, more preferably 3 to 20 atomic %, and yet more preferably 4 to 16 atomic %.

The ferromagnetic powder preferably contains, relative to Fe, Co at 10 to 40 atomic %, Al at 2 to 20 atomic %, and Y at 1 to 15 atomic %.

These ferromagnetic metal powders may be treated in advance, prior to dispersion, with a dispersant, a lubricant, a surfactant, an antistatic agent, etc. Specifically, there are those described in JP-B-44-14090 (JP-B denotes a Japanese examined patent application publication), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005, and 3,389,014, etc.

The ferromagnetic metal powder may contain a small amount of a hydroxide or an oxide. The ferromagnetic metal powder can be obtained by a known production method and the following methods can be cited. There are a method involving reduction of a composite organic acid salt (mainly an oxalate) with a reducing gas such as hydrogen, a method in which iron oxide is reduced with a reducing gas such as hydrogen to give Fe or Fe—Co particles, a method involving thermolysis of a metal carbonyl compound, a method involving reduction by the addition of a reducing agent such as sodium borohydride, a hypophosphite, or hydrazine to an aqueous solution of a ferromagnetic metal, a method in which a powder is obtained by vaporizing a metal in an inert gas at low pressure, etc. The ferromagnetic metal powder thus obtained can be subjected to a known slow oxidation process, that is, it can be treated by any one of a method in which it is immersed in an organic solvent and then dried, a method in which after it is immersed in an organic solvent an oxygen-containing gas is fed in so as to form an oxidized film on the surface and it is then dried, and a method in which an oxidized film is formed on the surface by adjusting the partial pressures of oxygen gas and an inert gas without using an organic solvent.

The $S_{BET}$ of the ferromagnetic metal powder used in the magnetic layer of the present invention is 40 to 80 m$^2$/g, and preferably 45 to 70 m$^2$/g. When it is less than 40 m$^2$/g, the noise increases, and when it exceeds 80 m$^2$/g, there is a tendency for it to become difficult to obtain surface smoothness, which is undesirable.

The crystallite size of the ferromagnetic metal powder is 80 to 230 Å, preferably 100 to 230 Å, and particularly preferably 110 to 175 Å. The average length of the major axis of the ferromagnetic metal powder is preferably 50 to 190 nm, and more preferably 30 to 100 nm. The average acicular ratio of the ferromagnetic metal powder is preferably 3.0 to 10.0, and more preferably 3.0 to 9.0. The coefficient of variation of the acicular ratio is preferably 5 to 30%, and more preferably 5% to 28%.

In a particularly preferred magnetic recording medium, the ferromagnetic powder in the magnetic layer contains Fe as a main component, has a major axis length of 50 to 190 nm, and a crystallite size of 100 to 230 Å.

The water content of the ferromagnetic metal powder is preferably set at 0.01 to 2 wt %. The water content of the ferromagnetic metal powder is preferably optimized according to the type of binder described below.

The ferromagnetic metal powder has a tap density of 0.2 to 0.8 g/ml. When it is greater than 0.8 g/ml, since it cannot be oxidized uniformly by slow oxidation, it becomes difficult to handle safely and the magnetization of the tape obtained might decrease over time. When the tap density is less than 0.2 g/ml, dispersion might become inadequate.

The pH of the ferromagnetic metal powder is preferably optimized according to the binder used in combination therewith. The pH is usually in the range of 4 to 12, and preferably from 6 to 10. The ferromagnetic metal powder may be subjected to a surface treatment with Al, Si, P, or an oxide thereof, if necessary. The amount thereof present on the surface is usually 0.1 to 20 wt % relative to the treated ferromagnetic metal powder. The surface treatment can preferably suppress adsorption of a lubricant such as a fatty acid to 100 mg/m$^2$ or below. The ferromagnetic metal powder may contain soluble inorganic ions such as Na, Ca, Fe, Ni or Sr ions in some cases. It is preferable for them to be substantially absent, but their presence at 200 ppm or below does not particularly affect the characteristics. The ferromagnetic metal powder used in the present invention preferably has few pores, and the level thereof is 20 vol % or below, and more preferably 5 vol % or below. The form of the ferromagnetic metal powder may be any of acicular, rice-grain shaped and spindle-shaped. The SFD (switching-field distribution) of the ferromagnetic metal powder itself is preferably low, and 0.8 or below is preferred. It is also preferable to narrow the Hc distribution of the ferromagnetic metal powder. When the SFD is 0.8 or below, the electromagnetic conversion characteristics become good, the output becomes high, the magnetization reversal becomes sharp with a small peak shift, and it is suitable for high-recording-density digital magnetic recording. The Hc distribution of the ferromagnetic metal powder can be narrowed by improving the goethite particle size distribution, preventing sintering, etc. in the ferromagnetic metal powder.

The magnetic recording medium particularly preferably has a squareness ratio of 0.82 or above and an SFD of 0.5 or below.

Examples of the hexagonal ferrite powder include substitution products of barium ferrite, strontium ferrite, lead ferrite and calcium ferrite and Co substitution products, and among these barium ferrite is preferred. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. It may contain, in addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge or Nb. In general, those to which Co—Zn, Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The average plate size of the hexagonal ferrite powder is preferably 50 nm or below, more preferably 40 nm or below, and particularly preferably 10 to 35 nm.

In particular, when a magnetoresistive head is used for playback in order to increase the track density, the average tabular size is preferably 50 nm or below so as to reduce noise. The average tabular ratio obtained by averaging the tabular ratio (plate size/plate thickness) is preferably 1 to 15, and more preferably 1 to 8.

If the average tabular ratio is low, the degree of packing in the magnetic layer becomes high, which is desirable, but adequate orientation cannot be obtained in some cases. If it exceeds 15, the noise increases due to inter-particle stacking. The $S_{BET}$ of a powder having a particle size within this range is usually 10 to 200 m$^2$/g. The $S_{BET}$ substantially coincides with the value obtained by calculation using the plate size and the plate thickness. The distribution of the plate size and the plate thickness is preferably as narrow as possible. Although it is difficult to express the distribution using a numerical value and the distribution is not a regular distribution in many cases, the coefficient of variation of the particle size (plate size or plate thickness) is 10% to 200%. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the hexagonal ferrite powder can be adjusted so as to be on the order of $4 \times 10^3$ to $4 \times 10^4$ A/m (500 to 5,000 Oe). A higher Hc is advantageous for high-density recording, but it is restricted by the capacity of the recording head. The Hc can be controlled by the particle size (plate size, plate thickness), the types of element included and their amount, the element replacement sites, the conditions used for the powder formation reaction, etc. The saturation magnetization ($\sigma$s) is 40 to 80 A·m$^2$/kg (40 to 80 emu/g). A higher $\sigma$s is preferable, but there is a tendency for the Hc to become lower when the powder becomes finer. In order to improve the $\sigma$s, making a composite of magnetoplumbite ferrite with spinel ferrite, selecting the types of element included and their amount, etc. is well known. It is also possible to use a W type hexagonal ferrite. Furthermore, prior to dispersing the hexagonal ferrite powder in a binder, the surface thereof can be treated with a surface-treatment agent that is compatible with a dispersing medium and the binder. With regard to the surface-treatment agent, an inorganic or organic compound can be used. Representative examples include oxides and hydroxides of Si, Al, P, etc., and coupling agents such as various types of silane coupling agents and various kinds of titanate coupling agents. These compounds may be used when dispersing the hexagonal ferrite powder. The amount thereof put on the surface by the surface treatment is 0.1 to 10 wt % relative to the hexagonal ferrite powder prior to the treatment.

The coercive force (Hc) of the magnetic layer is usually $143 \times 10^3$ to $279 \times 10^3$ A/m (1800 to 3500 Oe), and preferably $143 \times 10^3$ to $239 \times 10^3$ A/m (1800 to 3000 Oe). The maximum magnetic flux density (Bm) of the magnetic layer is usually 350 to 700 mT (3500 to 7000 gauss (G)), and preferably 390 to 700 mT (3900 to 7000 G). Wen the Hc and Bm are less than the lower limits, sufficient output might not be obtained at low wavelength. When they are greater than the upper limits, the head used for recording might be saturated, thereby making it difficult to maintain the output.

In a particularly preferable magnetic recording medium, the coercive force of the ferromagnetic powder in the magnetic layer is $143 \times 10^3$ to $239 \times 10^3$ A/m (1800 to 3000 Oe), and the σs is 110 to 180 A·m²/Kg (110 to 180 emu/g).

With regard to the binder used in the magnetic layer and the non-magnetic layer of the magnetic recording medium of the present invention, conventionally known thermoplastic resins, thermosetting resins, reactive type resins and mixtures thereof can be used. With regard to the thermoplastic resins, those having a glass transition temperature of −100 to 150° C., a number-average molecular weight of 1,000 to 200,000, and preferably 10,000 to 100,000, and a degree of polymerization on the order of 50 to 1,000 can be cited.

Examples of such binders include polymers or copolymers containing, as constituent units, vinyl chloride, vinyl acetate, vinyl alcohol, maleic acid, acrylic acid, an acrylate ester, vinylidene chloride, acrylonitrile, methacrylic acid, a methacrylate ester, styrene, butadiene, ethylene, vinyl butyral, vinyl acetal, a vinyl ether, etc., polyurethane resins and various rubber-based resins.

The binders above can also be used for preparing the abrasive liquid paste.

With regard to examples of the thermosetting resins and the reactive type resins, phenol resins, epoxy resins, polyurethane thermosetting type resins, urea resins, melamine resins, alkyd resins, acrylic-based reactive resins, formaldehyde resins, silicone resins, epoxy-polyamide resins, mixtures of a polyester resin and an isocyanate pre-polymer, mixtures of a polyester polyol and a polyisocyanate, mixtures of a polyurethane and a polyisocyanate, etc. can be cited.

In order to yet further improve the dispersibility of the ferromagnetic powder and the durability of the magnetic layer, if necessary, it is preferred to incorporate at least one polar group selected from —COOM, —SO₃M, —OSO₃M, —P=O(OM)₂, —O—P=O(OM)₂ (where M denotes hydrogen or an alkali metal atom), —OH, —NR₂, —N⁺R₃ (where R denotes a hydrocarbon group), an epoxy group, —SH, and —CN into the binder by copolymerization or an addition reaction. The amount of such a polar group is $10^{-8}$ to $10^{-1}$ mol/g, and preferably $10^{-6}$ to $10^{-2}$ mol/g.

The amount of binder used in the magnetic recording medium is 5 to 50 wt %, and preferably 10 to 30 wt %, based on the weight of the ferromagnetic powder. When a vinyl chloride resin is used, the amount thereof is 5 to 100 wt %, when a polyurethane resin is used, the amount thereof is 0 to 100 wt %, the amount of polyisocyanate is 2 to 100 wt %, and they are preferably used in combination.

A magnetic recording medium containing as a part of the binder a polyurethane resin containing a cyclic structure and an ether group is particularly preferred.

A magnetic recording medium whose magnetic layer has a Tg in the range of 30° C. to 150° C. is also particularly preferred.

The degree of packing (Bm/4πσs) of the ferromagnetic powder of the magnetic layer can be calculated from the saturation magnetization (σs) and Bm (maximum magnetic flux density) of the ferromagnetic powder used. In the present invention, the packing density is preferably 1.7 g/ml or above, more preferably 1.9 g/ml or above, and most preferably 2.1 g/ml.

When a polyurethane is used in the present invention, the polyurethane has a glass transition temperature of −50° C. to 100° C., an elongation at break of 100% to 2,000%, a breaking stress of $0.5 \times 10^{-2}$ to $100 \times 10^{-2}$ MPa (0.05 to 10 kg/cm²), and a yield point of $0.5 \times 10^{-2}$ to $100 \times 10^{-2}$ MPa (0.05 to 10 kg/cm²).

Examples of the polyisocyanate used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with a polyalcohol; and polyisocyanates formed by an isocyanate condensation reaction.

The magnetic layer and/or the non-magnetic layer of the magnetic recording medium of the present invention usually can contain materials having various functions including a lubricant, an abrasive, a dispersant, an antistatic agent, a plasticizer, an anti-mold agent, etc. according to the intended purpose.

The present invention can also be preferably applied to a process for the production of a magnetic recording medium comprising a non-magnetic backcoat layer on the side opposite to the side where the magnetic layer has been provided.

Preferred modes for carrying out the present invention are listed below.

In a particularly preferred magnetic recording medium, the backcoat layer of a magnetic recording tape is formed by coating a dispersion of mainly carbon black in a binder, the Young's modulus in the longitudinal direction being 5 to 10 GPa (500 to 1000 kg/mm²).

In the magnetic recording medium of the present invention, two or more coated layers are formed on a support. With regard to a method for the formation thereof, a sequential multilayer-coating method (wet on dry method) and a simultaneous multilayer-coating method (wet on wet method) can be cited, and the latter is particularly desirable since an ultra thin magnetic layer can be formed.

The thickness of the support of the magnetic recording medium of the present invention is usually 1 to 100 μm. When it is used as a tape, the thickness is preferably 3 to 20 μm, and when it is used as a flexible disc, the thickness is preferably 40 to 80 μm. The thickness of the non-magnetic layer provided on the support is usually 0.5 to 10 μm, and preferably 0.5 to 3 μm.

In addition to the magnetic layer and the non-magnetic layer, another layer can be formed, depending on the intended purpose. For example, an undercoat layer may be provided between the support and the lower layer in order to improve the adhesion. The thickness of the undercoat layer is usually 0.01 to 2 μm, and preferably 0.05 to 0.5 μm. It is also possible to provide a backcoat layer on the side of the support opposite to the side where the magnetic layer is provided. The thickness of the backcoat layer is usually 0.1 to 2 μm, and preferably 0.3 to 1.0 μm. A known undercoat layer and a known backcoat layer can be used in this case.

The surface electrical resistivity of the backcoat layer is particularly preferably $1 \times 10^6$ Ω/square.

The support used in the present invention is not particularly limited, and those normally used can be employed. Examples of materials forming the support include various types of synthetic resin films such as polyethylene terephthalate, polyethylene, polypropylene, polycarbonate, polyethylene naphthalate, polyamide, polyamide imide, polyimide, polysulfone, and polyether sulfone, and metal foils such as aluminum foil and stainless foil.

In order to achieve the object of the present invention it is necessary for the center plane average surface roughness (Ra) (cutoff value 0.25 mm) of the support to be 0.03 μm or below, preferably 0.02 μm or below, and more preferably 0.01 μm or below.

The F-5 value in the web transport direction of the support used in the present invention is preferably $50 \times 10^{-3}$ to $500 \times 10^{-3}$ GPa (5 to 50 kg/mm$^2$), and the F-5 value in the web width direction is preferably $30 \times 10^{-3}$ to $300 \times 10^{-3}$ GPa (3 to 30 kg/mm$^2$). The F-5 value in the web longitudinal direction is normally higher than that in the web width direction, but it is not limited thereby if a particularly high strength is required in the width direction.

In addition, the thermal shrinkage of the support in the web transport direction and in the width direction at 100° C. for 30 minutes is preferably 3% or less, and more preferably 1.5% or less, and the thermal shrinkage at 80° C. for 30 minutes is preferably 1% or less, and more preferably 0.5% or less. The tensile strength in both directions is preferably 0.05 to 1 GPa (5 to 100 kg/mm$^2$) and the modulus of elasticity is preferably 1 to 20 GPa (100 to 2,000 kg/mm$^2$).

The magnetic recording medium of the present invention is obtained by kneading and dispersing a non-magnetic powder or a magnetic powder and a binder using an organic solvent, together with another additive if necessary; coating a support with the non-magnetic coating solution or the magnetic coating solution; orienting if necessary; and drying.

The magnetic recording medium of the present invention can be a tape for video, audio, etc. or a flexible disc or a magnetic disc for data storage, and is particularly useful as a medium for digital recording where signal loss caused by dropouts is fatal. Furthermore, providing a non-magnetic layer as a lower layer and making the thickness of the magnetic layer on top of the lower layer 0.5 μm or less can give a high density and high capacity magnetic recording medium having high electromagnetic conversion characteristics, and excellent overwrite characteristics.

EXAMPLES

The present invention will be explained in detail below by reference to examples, but the present invention is not limited by the examples. It should be noted that the designation "parts" in the examples means "parts by weight".

Examples 1 to 3

| (1) Lower non-magnetic layer | | |
|---|---|---|
| Non-magnetic powder α-Fe$_2$O$_3$ | | 80 parts |
| Average major axis length | 0.1 μm | |

| -continued | | |
|---|---|---|
| Specific surface area by BET method | 48 m$^2$/g | |
| pH | 8 | |
| Fe$_2$O$_3$ content | at least 90% | |
| DBP oil absorption | 27 to 38 ml/100 g | |
| Surface-treatment agent | Al$_2$O$_3$ | |
| Carbon black | | 20 parts |
| Average primary particle size | 16 nm | |
| DBP oil absorption | 80 ml/100 g | |
| pH | 8.0 | |
| Specific surface area by BET method | 250 m$^2$/g | |
| Volatiles content | 1.5% | |
| Vinyl chloride copolymer (MR-110; manufactured by Nippon Zeon Corporation) | | 8 parts |
| Polyester polyurethane resin Neopentyl glycol/caprolactone polyol/MDI = 0.9/2.6/1 | | 4 parts |
| —SO$_3$Na content | $1 \times 10^{-4}$ eq/g | |
| Tg | 65° C. | |
| Phenyl phosphonate | | 3 parts |
| Butyl stearate | | 1 part |
| Stearic acid | | 1 part |
| Methyl ethyl ketone | | 100 parts |
| Cyclohexanone | | 50 parts |
| (2) Magnetic layer | | |
| a) Magnetic liquid | | |
| Ferromagnetic metal powder Fe/Co = 70/30 | | 100 parts |
| Hc | $195 \times 10^3$ A/m (2450 Oe) | |
| Specific surface area by BET method | 43 m$^2$/g | |
| Crystallite size | 160 A | |
| Surface-treatment agent | Al$_2$O$_3$ | |
| Particle size (major axis size) 0.125 μm flattened acicular particles | | |
| Major width (minor axis length)/ minor width = 0.025/0.01 | | |
| σs | 157 A · m$^2$/kg (157 emu/g) | |
| Polyester polyurethane resin Neopentyl glycol/caprolactone- polyol/MDI = 0.9/2.6/1 | | 10 parts |
| —SO$_3$Na content | $1 \times 10^{-4}$ eq/g | |
| Carbon black (particle size 100 nm) | | 0.5 parts |
| Butyl stearate | | 1.5 parts |
| Stearic acid | | 0.5 parts |
| Methyl ethyl ketone | | 90 parts |
| Cyclohexanone | | 30 parts |
| Toluene | | 60 parts |
| b) Abrasive liquid paste | | |
| α-Alumina (particle size 0.18 μm) | | 4.5 parts |
| MR-110 | | 0.45 parts |
| Cyclohexanone | | 9.2 parts |

The coating solution for the lower non-magnetic layer was prepared by kneading all the components except the stearic acid and the butyl stearate in an open kneader, followed by dispersing using a sand mill with zirconia beads. The dispersion so obtained was mixed with 3 parts of the polyisocyanate, and further with a solution of the stearic acid and the butyl stearate in methyl ethyl ketone and cyclohexanone, and the mixture was stirred to give a non-magnetic coating solution having a solids content of 28% and a solvent ratio of methyl ethyl ketone to cyclohexanone of 4:6.

The magnetic liquid was prepared by kneading the magnetic material, carbon black, polyurethane resin, methyl ethyl ketone, and cyclohexanone in an open kneader, followed by dispersing using a sand mill with zirconia beads.

The abrasive liquid paste was prepared by preparing a mixture of alumina: vinyl chloride copolymer (MR-110):cyclohexanone=45:4.5:50.5, subjecting the mixture to an ultrasonic dispersion treatment using a circulation type ultrasonic homogenizer (600 W, frequency 20 kHz, irradiation area 36 mmφ, distance between the irradiation area and a holder 3 mm, amplitude 30 μm) separately from the magnetic liquid and, without standing, mixing this abrasive liquid paste with the magnetic liquid immediately prior to coating. The mixture so obtained was stirred and further mixed and stirred with a solution of stearic acid and butyl stearate in methyl ethyl ketone and cyclohexanone to give a magnetic coating solution. The magnetic coating solution and the non-magnetic coating solution were filtered through a filter having an average pore size of 1 μm.

The speed at which the liquids were fed can be calculated back from the coating thickness, the coating width, and the speed at which a support was transported. In the flow diagram of FIG. 1 illustrating one embodiment, the ultrasonic disperser is of two a stage type, but it can be of a single stage type as described above depending on the speed at which the liquids are fed and the capability of the disperser, or may be of a cascade structure having three or more stages. In particular, when there is a large amount of liquid to be treated, a high dispersion efficiency can be maintained by employing multiple stages. A multiple stage type having about 10 stages can be employed, but there are preferably 2 to 5 stages.

A polyethylene naphthalate support having a thickness of 5.2 μm and an intensity of the component having a wavelength of 4.3 μm in an AFM roughness spectrum of 0.03 nm² was subjected to simultaneous multilayer-coating by applying the non-magnetic coating solution on the support at a dry thickness of 1.5 μm and, immediately after that, the magnetic coating solution on top of the non-magnetic coating solution at a dry thickness of 0.2 μm. While both the layers were still wet, the sample was subjected to orientation employing a cobalt magnet having a magnetic field strength of 300 mT (3,000 G) and a solenoid having a magnetic field strength of 150 mT (1,500 G), dried, then subjected to a treatment using a 7-stage calender formed only from metal rolls at a temperature of 85° C., a pressure of 3500 N/cm (350 kg/cm), and a speed of 50 m/min, and slit into a width of 6.35 mm to give a DVC video tape for consumer use.

Evaluation Method (1) Magnetic Characteristics

Measured using a vibrating sample magnetometer (manufactured by Toei Industry K.K.) at an Hm of $7.96 \times 10^2$ A/m (10 kOe).

(2) Output

Measured using a drum tester. The head used for recording and playback was a MIG head having a Bs of 1.2 T and a gap length of 0.22 μm.

The relative speed of the head to the medium during recording/playback was 10.5 m/sec, a signal at a single frequency of 21 MHz was recorded, and the playback spectrum was examined using a spectrum analyzer (manufactured by Shibasoku K.K.).

(3) Measurement of Thickness

A tape sample was cut out at a thickness of about 0.1 μm in the longitudinal direction by a diamond cutter and an image was taken using a transmission electron microscope at a magnification of 100,000 times. The surface of the magnetic layer and the interface between the magnetic layer and the non-magnetic layer were marked with lines and the thickness was measured using an IBAS2 image processing device manufactured by Zeiss. When the length so measured was 21 cm, measurement was carried out 85 to 300 times, and an average value d and a standard deviation σ were calculated.

Bm was calculated from the thickness d of the magnetic layer and the φm value measured using the vibrating sample magnetometer (manufactured by Toei Industry K.K.).

(4) Ra

The center line average roughness Ra was measured by an optical interference method using a digital optical profile meter (manufactured by WYKO) with a cutoff of 0.25 mm.

(5) AFM Surface Protrusion

The surface roughness of a 30 μm square was measured using a Nanoscope 3 machine manufactured by Digital Instruments with a pyramidal contact mode probe made of SiN with a tip angle of 70°. The numbers of surface protrusions having a height of 15 nm or above and those having a height of 20 nm or above relative to the reference surface were counted.

(6) Transport Durability

An unused 60 minute long virgin tape was run repeatedly and continuously 100 times using a DJ-1 camcorder manufactured by Matsushita Electric Industrial Co., Ltd. at RT (23° C., 70%). Damage to the tape after the run was evaluated using the criteria below.

Damage to tape sliding face

NG: damage observed in a 200× photograph
OK: no damage observed in a 200× photograph (7) Mag μ Value A tape was slid against a 4 mmφ SUS 420J member at RT for 1 pass and 100 passes with a lap angle of 180 degrees using a load of 10 g at a speed of 14 mm/s. The sliding resistance was measured and the coefficient of friction of the magnetic surface was calculated using the Euler equation.

(8) Repetitive Hw

The level of head wear was obtained by running an unused 60 minute long virgin tape repeatedly and continuously 100 times using a DJ-1 camcorder manufactured by Matsushita Electric Industrial Co., Ltd. at RT (23° C., 70%), and measuring the change in the level of head protrusion before and after the run using a HISOMET optical microscope manufactured by Union Optical Co., Ltd.

TABLE 1

| | Example 1 | Example 2 | Example 3 | Comp. Ex. 1 | Comp. Ex. 2 | Comp. Ex. 3 | Comp. Ex. 4 | Comp. Ex. 5 |
|---|---|---|---|---|---|---|---|---|
| Dispersion method | Separate | As on the left | As on the left | Simultaneous | Simultaneous | Separate | As on the left | As on the left |
| Dispersion media | Zirconia $ZrO_2$ | As on the left | As on the left | Glass | Zirconia $ZrO_2$ | As on the left | As on the left | As on the left |
| Media particle size | 1 mmφ | As on the left | As on the left | As on the left | 1 mmφ | As on the left | As on the left | As on the left |
| Proportion by volume of media in magnetic liquid within dispersing machine (%) | 60 | As on the left | As on the left | As on the left | 60 | As on the left | As on the left | As on the left |
| Dispersion time of magnetic liquid (min) (without abrasive for separate dispersion) | 90 | As on the left | As on the left | 360 | 360 | As on the left | 90 | As on the left |
| Dispersion of abrasive paste | Ultrasonic | As on the left | As on the left | (media) | (Media) | Media | As on the left | As on the left |
| Dispersion residence time (min) for abrasive paste | 2 min | As on the left | As on the left | (360) | (360) | 30 | 90 | 90 |
| Concentration of abrasive liquid paste | 35% | 50% | 35% | — | — | 50% | As on the left | 35% |
| Time for abrasive liquid paste to stand after dispersion | 1 min | As on the left | 1 day | — | — | 1 day | As on the left | As on the left |
| Re-dispersion of abrasive paste | None | As on the left | As on the left | — | — | Homodisper Circumf. speed 12 m/s for 30 min | As on the left | As on the left |
| Method for mixing magnetic liquid and abrasive paste | Homodisper Circumf. speed 12 m/s for 30 min | As on the left | As on the left | — | — | Homodisper Circumf. speed 12 m/s for 30 min | As on the left | As on the left |
| Layer structure | Multilayer | As on the left | As on the left | As on the left | Multilayer | As on the left | As on the left | As on the left |
| Magnetic layer thickness/non-magnetic layer thickness μm | 0.2/1.5 | As on the left | As on the left | As on the left | 0.2/1.5 | As on the left | As on the left | As on the left |
| Surface smoothness of magnetic layer: Ranm | 1.9 | 2.0 | 2.0 | 2.3 | 1.8 | 2.2 | 2.1 | 2.0 |
| Protrusions on magnetic layer surface | | | | | | | | |
| Number of protrusions of ≧20 nm | 16 | 18 | 19 | 26 | 6 | 10 | 13 | 12 |
| Number of protrusion of ≧15 nm | 58 | 50 | 54 | 42 | 8 | 18 | 26 | 22 |
| Magnetic layer Bm T | 0.350 | 0.351 | 0.350 | 0.350 | 0.370 | 0.360 | 0.3510 | 0.3520 |
| Output: dB | 1 | 0.8 | 0.8 | 0 | −3.5 | 0.5 | 0 | 0 |
| Transport durability | OK | OK | OK | OK | NG | NG | NG | NG |
| Mag μ value | | | | | | | | |
| 1 pass | 0.24 | 0.24 | 0.24 | 0.24 | 0.30 | 0.29 | 0.28 | 0.30 |
| 100 passes | 0.24 | 0.26 | 0.25 | 0.24 | ≧0.7 | 0.38 | 0.36 | 0.36 |
| Repetitive HW (μ/100 h) | 0.3 | 0.5 | 0.4 | 0.7 | 4 | 2 | 1.8 | 1.5 |

Explanation of Examples and Comparative Examples

Comparative Example 1 is a case where the abrasive and the magnetic material were simultaneously kneaded and dispersed using glass beads for a long time, so as to give a type for comparison.

In Comparative Example 2, an abrasive and a magnetic material were simultaneously kneaded and dispersed using zirconia beads for a long time; in comparison with Comparative Example 1 the Bm of the magnetic layer increased, but the output decreased, the Mag μ value greatly increased, and the transport durability deteriorated. The level of head wear also increased.

In Comparative Examples 3 and 4, an abrasive and a magnetic material were kneaded separately, each liquid was dispersed in a sand mill using zirconia beads for the dispersion times described in Table 1, and subsequently the liquids were mixed under the conditions for standing time and stirring described in Table 1. In Comparative Example 3, the degree of dispersion of the magnetic liquid was increased and the degree of dispersion of the abrasive liquid paste was decreased. There were fewer surface protrusions, and the output increased, but the Mag $\mu$ value greatly increased, and the transport durability deteriorated in comparison with Comparative Example 1. The level of head wear increased relative to that of Comparative Example 1.

In Comparative Example 4, the degree of dispersion of the magnetic liquid was decreased and the degree of dispersion of the abrasive liquid paste was increased. There were fewer surface protrusions, as in Comparative Example 3. Similarly, the Mag $\mu$ value greatly increased, and the transport durability deteriorated in comparison with Comparative Example 1. The level of head wear increased relative to that of Comparative Example 1.

In Comparative Example 5, the concentration of the abrasive liquid paste was reduced so as to suppress aggregation after dispersion in comparison with Comparative Example 4.

In comparison with Comparative Example 4, the level of head wear decreased, but the Mag $\mu$ value increased and there was a problem with the transport durability.

In Examples 1 to 3, in comparison with Comparative Example 4, the dispersion conditions of the abrasive liquid paste were changed from dispersion with media to an ultrasonic dispersion treatment, and the output, the transport durability, and the head wear were all improved at the same time.

In Example 1, the concentration of the abrasive liquid paste was 35%, and it was mixed with the magnetic liquid immediately following the ultrasonic dispersion treatment.

In Example 2, the concentration of the abrasive liquid paste was 50%, and it was mixed with the magnetic liquid immediately following the ultrasonic dispersion treatment.

In Example 3, the concentration of the abrasive liquid paste was 35%, and it was mixed with the magnetic liquid after standing for a day following the ultrasonic dispersion treatment.

A high output, a low level of head wear, and improved transport durability were achieved by changing the number and the profile of the protrusions on the surface (the heights and population densities of the abrasive and the carbon black).

Examples 4 to 6

A non-magnetic coating solution was prepared in the same manner as in Example 1 by kneading and dispersing using the same components as those for the lower non-magnetic layer (1) described in Example 1.

For the coating solution for the magnetic layer (2), unlike Example 1 in which the carbon black component was added to the magnetic liquid together with the ferromagnetic metal powder, in order to form a liquid paste of carbon black separate from the magnetic liquid, a magnetic layer was prepared as follows.

(2) Magnetic Layer
a) Magnetic Liquid

The same composition as that of the magnetic layer of Example 1 was used except that carbon black, butyl stearate, and stearic acid were not included.

b) Abrasive Liquid Paste

Exactly the same composition as that of magnetic layer b) of Example 1 was used.

| c) Carbon black liquid paste | |
|---|---|
| Carbon black (particle size 100 nm) | 0.5 parts |
| MR-110 | 0.5 parts |
| Cyclohexanone | 5.6 parts |

The magnetic material, polyester polyurethane resin, methyl ethyl ketone, and cyclohexanone of magnetic liquid a) were kneaded in an open kneader and then dispersed using a sand mill with zirconia beads.

The abrasive liquid paste b) was prepared as a mixture of alumina:vinyl chloride copolymer MR-110: cyclohexanone (=45:4.5:50.5), and the mixture was then dispersed separately from the magnetic liquid using a circulation type ultrasonic homogenizer (600 W, frequency 20 kHz, area irradiated 36 mm$\phi$, distance between the irradiation area and a holder 3 mm, amplitude 30 $\mu$m). Furthermore, carbon black liquid c) was subjected to the same ultrasonic dispersion treatment as that for the abrasive liquid paste b).

Immediately prior to coating, the magnetic liquid a), abrasive liquid paste b), and carbon black liquid paste c) so obtained were mixed without leaving them to stand, stirred, and further mixed and stirred with a solution of 0.5 parts of stearic acid and 1.5 parts of butyl stearate in 50 parts of methyl ethyl ketone and 30 parts of cyclohexanone to give a magnetic coating solution. The magnetic coating solution and the non-magnetic coating solution were filtered through a filter having an average pore size of 1 $\mu$m.

The speed at which the liquids were fed can be calculated back from the coating thickness, the coating width, and the speed at which the support was transported. In the flow diagram of FIG. 2 illustrating one embodiment, the ultrasonic disperser is of a two stage type, but it can be of a single stage type as described above depending on the speed at which the liquids are fed and the capability of the disperser or may be of a tandem structure having three or more stages. In particular, when there is a large amount of liquid to be treated, a high dispersion efficiency can be maintained by employing multiple stages. A multiple stage type having about 10 stages can be employed, but there are preferably 2 to 5 stages.

A polyethylene naphthalate support as in Example 1 was subjected to simultaneous multilayer-coating with the non-magnetic coating solution and the magnetic coating solution in the same manner as in Example 1, and the sample was subjected to orientation, calendering and slitting to give DVC video tapes for consumer use of Examples 4 to 6.

Various characteristics and magnetic characteristics were evaluated using the same methods as in Example 1 except that in the evaluation of the transport durability the tape was run 1000 times and the sliding in the evaluation of the Mag $\mu$ value was carried out for 1 pass and 1000 passes.

The results so obtained are given in Table 2.

TABLE 2

|  | Example 4 | Example 5 | Example 6 | Comp. Ex. 6 | Comp. Ex. 7 |
|---|---|---|---|---|---|
| Amount of carbon added to magnetic layer relative to 100 parts by weight of magnetic material | 1 | 1.5 | As on the left | 1 | As on the left |
| Dispersion method | Separate | As on the left | As on the left | Simultaneous | As on the left |
| Dispersion media | Zirconia $ZrO_2$ | As on the left | As on the left | Glass | Zirconia $ZrO_2$ |
| Media particle size | 1 mmφ | As on the left | As on the left | As on the left | As on the left |
| Proportion by volume of media in magnetic liquid within dispersing machine (%) | 60 | As on the left | As on the left | As on the left | As on the left |
| Dispersion time of magnetic liquid (min) (without abrasive for separate dispersion) | 90 | As on the left | 360 | As on the left | As on the left |
| Dispersion of carbon black paste | Ultrasonic | As on the left | As on the left | (media) | As on the left |
| Dispersion residence time (min) for carbon black paste | 20 min | As on the left | As on the left | (360) | As on the left |
| Concentration of carbon black liquid paste | 15% | As on the left | As on the left | — | — |
| Dispersion of abrasive paste | Ultrasonic | As on the left | As on the left | (media) | As on the left |
| Dispersion residence time (min) for abrasive paste | 20 min | As on the left | As on the left | (360) | As on the left |
| Concentration of abrasive liquid paste | 35% | As on the left | As on the left | — | — |
| Time liquid paste dispersed separately left to stand after dispersion | 1 min | As on the left | 1 day | — | — |
| Return dispersion of liquid paste dispersed separately | None | As on the left | As on the left | — | — |
| Method for mixing magnetic liquid/abrasive paste/carbon black paste | Homodisper circumf. 12 m/s for 30 min | As on the left | As on the left | — | — |
| Layer structure | Multilayer | As on the left | As on the left | As on the left | As on the left |
| Magnetic layer thickness/non-magnetic layer thickness μm | 0.2/1.5 | As on the left | As on the left | As on the left | As on the left |
| Surface smoothness of magnetic layer: Ranm | 1.9 | 2.0 | 1.8 | 2.3 | 1.8 |
| Protrusions magnetic layer surface |  |  |  |  |  |
| Number of protrusions of ≧20 nm | 18 | 22 | 21 | 26 | 6 |
| Number of protrusions of ≧15 nm | 59 | 62 | 60 | 42 | 8 |
| Magnetic layer Bm T | 0.351 | 0.348 | 0.369 | 0.350 | 0.370 |
| Output: dB | 1 | 0.7 | 0.8 | 0 | −3.5 |
| Transport durability |  |  |  |  |  |
| 1 min long 100 passes | OK | OK | OK | OK | NG |
| 1 min long 1000 passes | OK | OK | OK | OK |  |
| Mag μ |  |  |  |  |  |
| 1 pass | 0.24 | 0.22 | 0.24 | 0.24 | 0.30 |
| 100 passes | 0.24 | 0.22 | 0.25 | 0.24 | ≧0.7 |
| 1000 passes | 0.25 | 0.23 | 0.27 | 0.29 |  |
| Repetitive HW (μ/100 h) | 0.2 | 0.15 | 0.25 | 0.7 | 4 |

Explanation of Examples and Comparative Examples

Comparative Example 6 is a case where the abrasive and the magnetic material were simultaneously kneaded and dispersed using glass beads for a long time, so as to give a type for comparison.

In Comparative Example 7, an abrasive and a magnetic material were simultaneously kneaded and dispersed using zirconia beads for a long time; in comparison with Comparative Example 6 the Bm of the magnetic layer increased, but the output decreased, the Mag μ value greatly increased, and the transport durability deteriorated.

The level of head wear also increased.

In Examples 4 to 6, the magnetic liquid, the abrasive liquid paste, and the carbon black liquid paste were separately dispersed, the abrasive liquid paste and the carbon black liquid paste were subjected to an ultrasonic dispersion treatment, and then mixed successively with the magnetic liquid.

In Example 5, the amount of carbon black added was increased in comparison with Example 4.

In Example 6, the speed at which the magnetic liquid was dispersed was increased in comparison with Example 5, but otherwise the liquid was prepared under the same conditions; the Bm of the magnetic layer increased, the magnetic material was dispersed uniformly, and control of the surface protrusion profile (the heights and population densities of the abrasive and the carbon black) resulted in improved output, a lower level of head wear, and enhanced transport durability.

Moreover, Examples 4 to 6 gave better results regarding the level of head wear than those of Examples 1 to 3.

What is claimed is:

1. A process for producing a magnetic recording medium, comprising:
   (1) separately preparing (a) a magnetic liquid comprising mainly a ferromagnetic powder and a binder, and (b) an abrasive liquid paste comprising an abrasive and a binder; and then
   (2) subjecting the abrasive liquid paste to an ultrasonic dispersion treatment; and then
   (3) mixing the abrasive liquid paste with the magnetic liquid to prepare a magnetic coating solution for the magnetic layer; and
   (4) applying the magnetic coating solution to a non-magnetic flexible support directly or through a non-magnetic layer.

2. The process for the production of a magnetic recording medium according to claim 1 wherein in the step (2) the abrasive liquid paste that has been subjected to the ultrasonic dispersion treatment is mixed with the magnetic liquid following the ultrasonic dispersion treatment without leaving the abrasive liquid paste to stand.

3. The process for the production of a magnetic recording medium according to claim 2 wherein in the step (2) the abrasive liquid paste is subjected to successive ultrasonic dispersion treatments using a multiple stage cascade type ultrasonic disperser and then mixed with the magnetic liquid.

4. The process for the production of a magnetic recording medium according to claim 1 wherein the abrasive is chosen from the group consisting of α-alumina, γ-alumina, fused alumina, corundum, artificial corundum, silicon carbide, chromium oxide ($Cr_2O_3$), diamond, synthetic diamond, garnet, emery (main components: corundum and magnetite), and α-$Fe_2O_3$.

5. The process for the production of a magnetic recording medium according to claim 1 wherein the ultrasonic dispersion treatment employs ultrasonic waves having a frequency of about 15 to 40 kHz.

6. The process for the production of a magnetic recording medium according to claim 1 wherein the ferromagnetic powder is a ferromagnetic metal powder or a hexagonal ferrite powder.

7. The process for the production of a magnetic recording medium according to claim 6 wherein the ferromagnetic metal powder contains, in addition to α-Fe, at least one atom chosen from the group consisting of Al, Si, Ca, Y, Ba, La, Nd, Co, Ni, and B.

8. The process for the production of a magnetic recording medium according to claim 1 wherein the ultrasonic dispersion treatment is carried out after a preliminary dispersion treatment has been carried out using a sand grinder.

9. The process for the production of a magnetic recording medium according to claim 8 wherein the sand grinder used for the preliminary dispersion treatment employs glass beads or zirconia (Zr) beads.

10. The process for the production of a magnetic recording medium according to claim 1 wherein the magnetic recording medium comprises the support, a lower non-magnetic layer is present and comprises mainly a non-magnetic inorganic powder and a binder and is provided on top of the support, and the application of the magnetic coating solution forms a magnetic layer provided on top of the lower non-magnetic layer.

11. The process for the production of a magnetic recording medium according to claim 10 wherein the lower non-magnetic layer and the magnetic layer are provided by simultaneous coating.

12. The process for the production of a magnetic recording medium according to claim 11 wherein the thickness of the lower non-magnetic layer is 0.5 to 3 μm, and the thickness of the magnetic layer is 0.05 to 0.3 μm.

13. A process for producing a magnetic recording medium, comprising:
    (1) separately preparing (a) a magnetic liquid comprising mainly a magnetic powder and a binder, (b) an abrasive liquid paste comprising an abrasive and a binder, and (c) a carbon black liquid paste comprising carbon black and a binder; and then
    (2) individually subjecting the abrasive liquid paste and the carbon black liquid paste to ultrasonic dispersion treatments; and then
    (3) mixing the abrasive liquid paste and the carbon black liquid paste with the magnetic liquid to prepare a magnetic coating solution; and
    (4) applying the magnetic coating solution to a non-magnetic flexible support directly or through a non-magnetic layer.

14. The process for the production of a magnetic recording medium according to claim 13 wherein the abrasive liquid paste and the carbon black liquid paste that have been subjected to the ultrasonic dispersion treatment are mixed with the magnetic liquid following the ultrasonic dispersion treatment without leaving the abrasive liquid paste and the carbon black liquid paste to stand.

15. The process for the production of a magnetic recording medium according to claim 14 wherein in the step (2) the abrasive liquid paste and the carbon black liquid paste are individually subjected to successive ultrasonic dispersion treatments using a multiple stage cascade type ultrasonic disperser and the liquid pastes are then both mixed with the magnetic liquid.

16. The process for the production of a magnetic recording medium according to claim 13 wherein the ratio by weight of the binder relative to the abrasive in the abrasive liquid paste and the ratio by weight of the binder relative to the carbon black in the carbon black liquid paste are 1/20 to 1/2.

17. The process for the production of a magnetic recording medium according to claim 13 wherein the binder used in combination with the abrasive or the carbon black comprises a vinyl chloride copolymer or a polyurethane resin.

18. The process for the production of a magnetic recording medium according to claim 13 wherein the carbon black has an $S_{BET}$ of 5 to 500 $m^2$/g, a DBP oil absorption of 10 to 1500 ml/100 g, and an average particle size of 5 to 300 nm.

* * * * *